US00RE45648E

(19) United States
(12) Reissued Patent
Ollinger, IV

(10) Patent Number: US RE45,648 E
(45) Date of Reissued Patent: Aug. 11, 2015

(54) DREDGE CUTTERHEAD

(75) Inventor: Charles George Ollinger, IV, Portland, OR (US)

(73) Assignee: ESCO Corporation, Portland, OR (US)

(21) Appl. No.: 11/153,886

(22) Filed: Jun. 16, 2005

Related U.S. Patent Documents

Reissue of:
(64) Patent No.: 6,578,294
Issued: Jun. 17, 2003
Appl. No.: 09/776,020
Filed: Feb. 2, 2001

(51) Int. Cl.
*E02F 3/08* (2006.01)
*E02F 3/92* (2006.01)
*E02F 9/28* (2006.01)

(52) U.S. Cl.
CPC ..... *E02F 3/9231* (2013.01); *E02F 9/2866* (2013.01)

(58) Field of Classification Search
USPC ..... 37/324, 326, 327, 337, 342; 299/87.1, 299/75
See application file for complete search history.

(56) References Cited

U.S. PATENT DOCUMENTS

| | | | | | |
|---|---|---|---|---|---|
| 365,140 | A | * | 6/1887 | Lynch | 37/327 |
| 637,831 | A | | 11/1899 | Robinson | |
| 727,691 | A | * | 5/1903 | Robinson | 37/327 |
| 768,106 | A | | 8/1904 | Williams | |
| 776,049 | A | | 11/1904 | Fruhling | |
| 977,901 | A | | 12/1910 | Robinson | |
| 1,226,386 | A | * | 5/1917 | Sackett | 37/328 |
| 1,316,349 | A | * | 9/1919 | Calder | 37/328 |
| 1,448,579 | A | | 3/1923 | Tideman | |
| 1,460,558 | A | | 7/1923 | Olden | |
| 1,763,769 | A | | 6/1930 | Fischer | |
| 2,029,816 | A | * | 2/1936 | Ewing | 37/327 |
| 2,040,303 | A | * | 5/1936 | Gaylord | 37/327 |
| 2,090,790 | A | * | 8/1937 | Fray | 37/327 |
| 2,103,124 | A | * | 12/1937 | Stires | 37/328 |
| 2,233,943 | A | | 3/1941 | Gaylord | |
| 2,340,216 | A | * | 1/1944 | Gill | 175/413 |
| 2,420,420 | A | | 5/1947 | Durdin | |
| 2,530,951 | A | * | 11/1950 | Enright | 210/415 |
| 2,702,437 | A | * | 2/1955 | Cushing | 198/664 |
| 2,834,128 | A | | 5/1958 | Kolbe | |
| 2,991,568 | A | | 7/1961 | Smith | |
| 3,131,051 | A | | 4/1964 | Sova | |
| 3,171,220 | A | | 3/1965 | Schram | |
| 3,313,051 | A | | 4/1967 | Sova | |
| 3,760,518 | A | | 9/1973 | Hamm | |

(Continued)

FOREIGN PATENT DOCUMENTS

| | | |
|---|---|---|
| EP | 0236692 | 9/1987 |

OTHER PUBLICATIONS

ESCO Dredge Products, 1997; ESCO Spherilok Rock Dredge Cutterheads; 5 Pages.

(Continued)

*Primary Examiner* — Matthew Buck
(74) *Attorney, Agent, or Firm* — Steven P. Schad

(57) ABSTRACT

A dredge cutterhead has a plurality of helical arms interconnecting a hub and a ring. Each of the arms has a front leading edge for attachment of cutting teeth. In one aspect, each of the arms has a trough portion, and the arm is shaped such that dredged material is directed toward the ring along the center of the trough portion. In another aspect, the ring of the cutterhead defines an annular channel for receiving loosened material.

58 Claims, 7 Drawing Sheets

(56) References Cited

U.S. PATENT DOCUMENTS

| | | | | | |
|---|---|---|---|---|---|
| 3,786,996 | A | | 1/1974 | Richter | |
| 3,807,066 | A | * | 4/1974 | Proehl | 37/327 |
| 3,808,716 | A | * | 5/1974 | Verbeek | 37/328 |
| 3,971,513 | A | | 7/1976 | Klip | |
| 4,050,170 | A | * | 9/1977 | Proehl | 37/328 |
| 4,080,708 | A | | 3/1978 | Decombe | |
| 4,135,318 | A | | 1/1979 | Volbeda | |
| 4,197,662 | A | | 4/1980 | McAulay et al. | |
| 4,236,857 | A | | 12/1980 | Willi | |
| 4,320,925 | A | | 3/1982 | Bowes | |
| 4,327,507 | A | | 5/1982 | Volbeda | |
| 4,365,427 | A | | 12/1982 | Chapman | |
| 4,373,277 | A | | 2/1983 | Cucheran | |
| 4,398,362 | A | | 8/1983 | Weinert | |
| 4,461,513 | A | * | 7/1984 | Berchem | 175/413 |
| 4,702,024 | A | | 10/1987 | Shiba | 37/327 |
| 4,711,504 | A | | 12/1987 | Berchem | |
| 4,891,893 | A | | 1/1990 | Bowes | |
| 5,147,030 | A | | 9/1992 | Buschbom | |
| 5,617,654 | A | * | 4/1997 | Wetta, II | 37/326 |
| 6,053,698 | A | | 4/2000 | Hergt | |

OTHER PUBLICATIONS

ESCO, Helilok Sand and Clay Dredge Cutterheads; 1997; 2 Pages.
ESCO, Spherilok Rock Dredge Cutterheads 1997; 2 Pages.

* cited by examiner

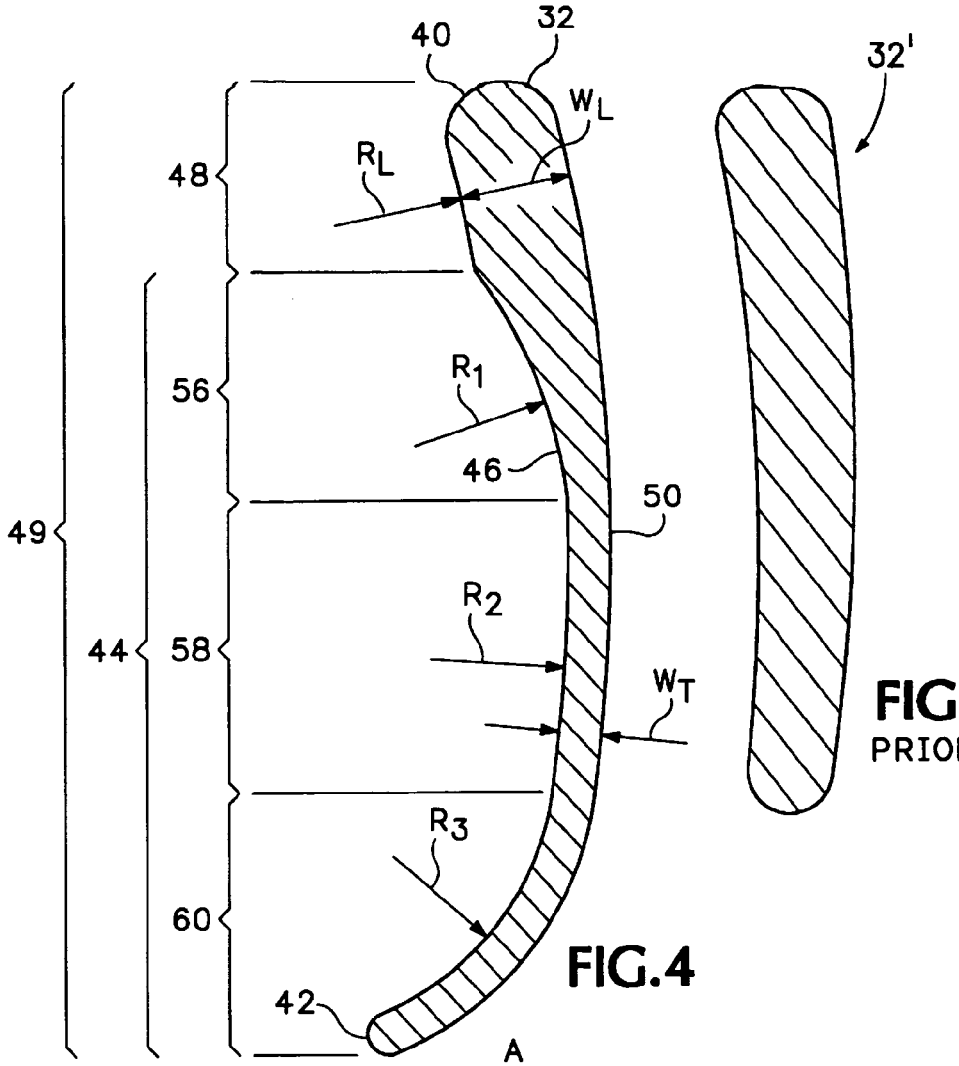
FIG.4A
PRIOR ART
FIG.4
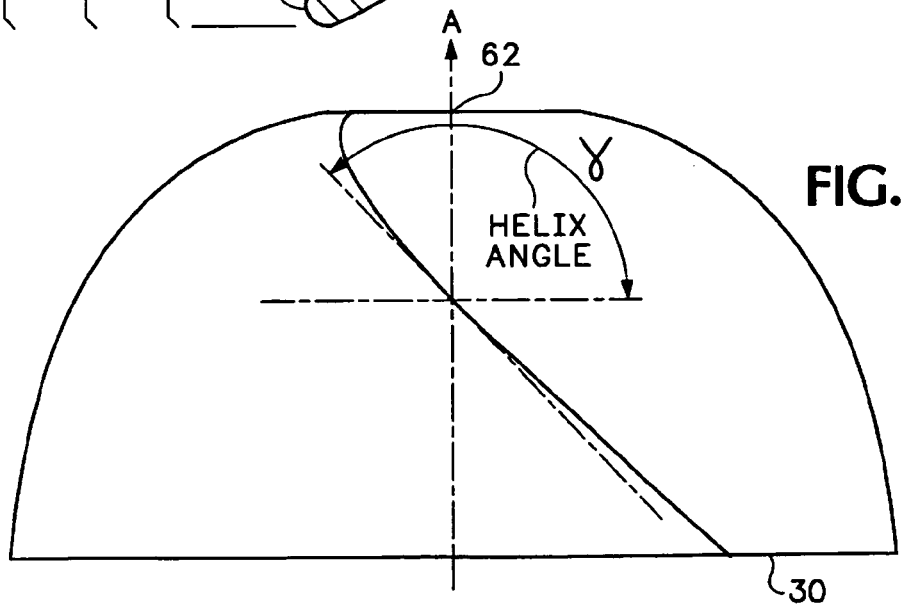
FIG.9

DREDGE CUTTERHEAD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention relates to a dredge cutterhead used to remove material from harbors, shipping channels, and other marine environments and mining operations.

Dredge cutterheads are generally hemispherical with a multiplicity of hard rock cutting teeth or replaceable edges projecting outwardly from helical support arms or blades disposed about the hemispherical surface of the cutterhead. An example of such a dredge cutterhead is disclosed in Bowes, Jr., U.S. Pat. No. 4,891,893. The cutterhead has a hub which fits around a shaft that provides the torque for turning the cutterhead in its operation of dredging. The cutterhead encounters all kinds of materials, including rock, sand and clay which must be removed from the bed being dredged.

Conventional cutterhead arms are shaped to minimize wear, but are not designed to move material. However, one of the problems encountered by cutterheads is that the material loosened by the cutting teeth must be directed into a suction pipe in order to be removed from the bottom of the waterway. As the cutterhead moves across the waterway bottom, the cutting teeth dig below the bed to loosen material. Unfortunately, a substantial portion of the material loosened by the cutting teeth does not reach the suction mouth, which is generally located adjacent to the lower side of the ring of the cutterhead. Instead, some of the loosened material quickly falls off the trailing edge of the digging arm and tumbles onto the following arm. When the cutterhead is operated at a steep ladder angle (for example as shown in FIG. 1), the loosened material remains near the hub end of the arm, and prevents admission of new material into the cutterhead.

The result is that the finished bed depth provided by the dredge cutterhead is often limited to the depth of the mouth of the suction pipe, rather than the depth of cut achieved by the cutting teeth. Since the dredge cutterhead itself is large and is often operated at an inclined ladder angle during use, the difference between the depth of cut achieved by the cutting teeth and the depth of the suction mouth may be as large as three to four feet. Accordingly, in order to achieve a specified finished bed depth, it is often necessary to cut into the bed substantially below the specified finished bed depth so that a sufficient amount of material may be removed. This results in additional time and effort needed to achieve a specified finished bed depth.

One attempt to direct material inwardly from the cutterhead to the suction pipe is disclosed in Fray, U.S. Pat. No. 2,090,790, which discloses a rotary cutter comprised of a plurality of blades. The body of each blade extends substantially in the line of a helix taken around the center of rotation, and the cut material accumulates within the space defined by the cutting blades, to be discharged into the usual suction pipe. Each blade provides a plurality of rib formations which are intended to propel movement of the earth or other materials being handled to the suction pipe.

Another attempt to move dredged material is disclosed in Shiba et al., U.S. Pat. No. 4,702,024, which discloses scoop-in plates 7 coupled between helical vanes 3 and a ring 24.

Earth and sand are scooped in by means of the scoop-in plate 7 so as to be directed toward the suction tube 5. However, the vanes themselves do not capture material so as to move the material toward the scoop-in plates.

Another dredge cutterhead has involved adding at the upper portion of the arm a wall at a sharp angle following a conventionally shaped cutterhead arm. The lower portion of the arm was shaped like that of a conventional cutterhead. Cross-sections of the arm of this prior art cutterhead are shown in FIGS. 10A-10D, which correspond to the locations of the cross-sections 6A-6D of the present invention. This arm shape caused dredged material to accumulate in the upper portion of the arm at the sharply angled juncture between the leading edge of the arm and the rear wall. This resulted in material jamming the interior of the cutterhead, and prevented the cutterhead from removing dredged material.

What is therefore desired is a dredge cutterhead that efficiently captures the loosened material within the cutterhead, that moves the dredged material to the mouth of the suction pipe, that supports and allows for the easy replacement of standard cutting teeth, and that is capable of withstanding the extreme forces encountered during dredging without breaking or becoming deformed.

SUMMARY OF THE INVENTION

The present invention overcomes the aforesaid drawbacks of the prior art by providing an improved dredge cutterhead.

In a first aspect of the invention, a dredge cutterhead comprises a hub, a ring, and a plurality of helical arms interconnecting the hub and the ring. Each of the helical arms has a leading edge for attachment of cutting teeth, a trailing edge, and a trough portion therebetween. The arm is shaped such that the net force exerted on material in the trough portion pushes the material toward the ring substantially along the center of the trough portion. By "net force" is meant the force exerted on the material by the combination of gravity, buoyancy and centrifugal force.

In a second related aspect of the invention, a dredge cutterhead comprises a plurality of helical arms, the helical arms interconnecting a hub and a ring. Each of the helical arms has a leading edge for attachment of cutting teeth, a trailing edge, and a trough portion therebetween. Each arm has a degree of curvature near the ring of at least 10%.

These aspects of the invention provide several advantages. By shaping the arm so that the net force directs material toward the ring, the arm acts like a pump vane to move material efficiently toward the mouth of the suction pipe. In addition, by providing a relatively large degree of curvature near the ring, the trough portion of the arm is shaped so as to retain the dredged material within the cutterhead as it flows toward the suction pipe. Material loosened by the cutting teeth flows along the trough portion of the arm and toward the ring. The trough portion prevents the loose material from spilling over the trailing edge of the arm and out of the interior of the cutterhead. The cutterhead thus improves the efficiency of dredging and achieves a deeper finished bed depth for a given depth of cut.

In another aspect of the invention, a dredge cutterhead comprises a hub, a ring and a plurality of helical arms interconnecting the hub and the ring. Each of the helical arms is capable of supporting a plurality of cutting teeth. An annular channel is defined by the ring for retaining loosened material.

This aspect of the invention also serves to facilitate movement of loose, dredged material from the interior of the cutterhead into the suction pipe. Material loosened by the cutting teeth is transported along the arms toward the ring. Once the material enters the ring, the channel retains the loose material. Thus, notwithstanding the rotation of the cutterhead, the loose material remains inside the interior portion of the ring until it is removed by the suction pipe.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 4 is a sectional view of an arm taken along the line 4-4 of FIG. 2.

FIG. 4A is a sectional view of a prior art arm taken at about the same location as that of FIG. 4.

FIG. 9 is a simplified schematic side view of a cutterhead of the present invention with all but one arm removed showing the helix angle of an arm.

DETAILED DESCRIPTION OF THE PREFERRED EMBODIMENTS

The present invention is directed toward a dredge cutterhead that improves the ability of the cutterhead to capture dredged, loosened material within the interior of the cutterhead and to move the loosened material toward the mouth of the suction pipe. The dredge cutterhead of the present invention may be used with any conventional dredger used for cutter-suction dredging.

Figure 1:
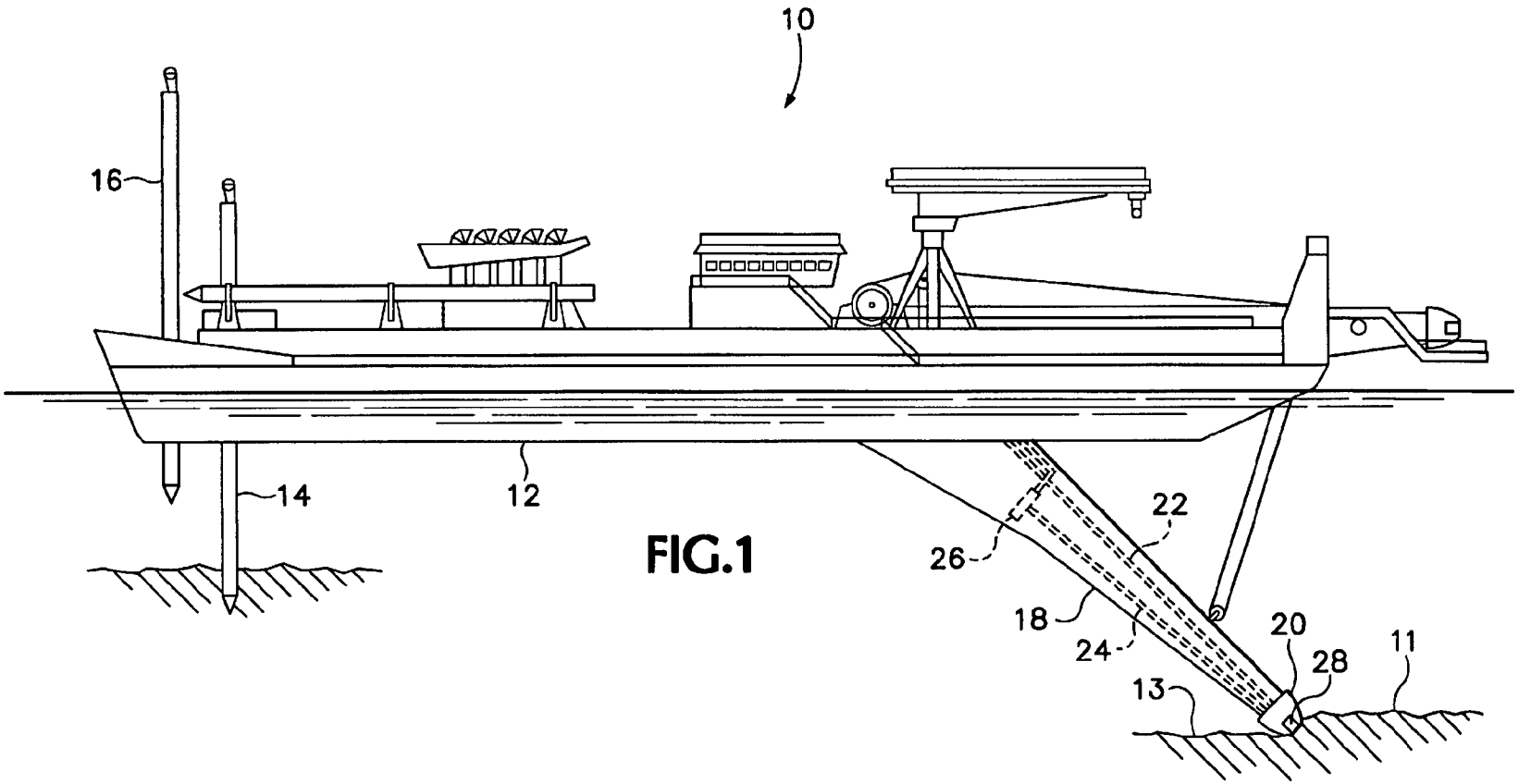
FIG. 1 is a simplified side elevation view of a dredge showing the dredge cutterhead in operation.

Referring now to the drawings, wherein like numerals refer to like elements, FIG. 1 shows a simplified representation of an exemplary cutter-suction dredger 10 having a hull 12. At one end of the hull are located two spuds 14 and 16, which are elevatably movable and spaced apart in the widthwise direction of the ship. At the opposite end of the hull is located a ladder 18 which supports the dredge cutterhead 20. The ladder houses a shaft 22 for supporting and rotating the cutterhead, and a suction pipe 24 and suction pump(s) 26 which remove dredged material from the cutterhead. The ladder, suction pipe and shaft are conventional and may be of any type suitable for use with a cutterhead 20. Similarly, the cutterhead 20 of the present invention may be used with any conventional cutter-suction dredging craft, such as a boat or barge, and operated in any conventional manner. The cutterhead 20 cuts into the bed 11, which after dredging is deepened to the finished bed depth 13.

Figure 2:
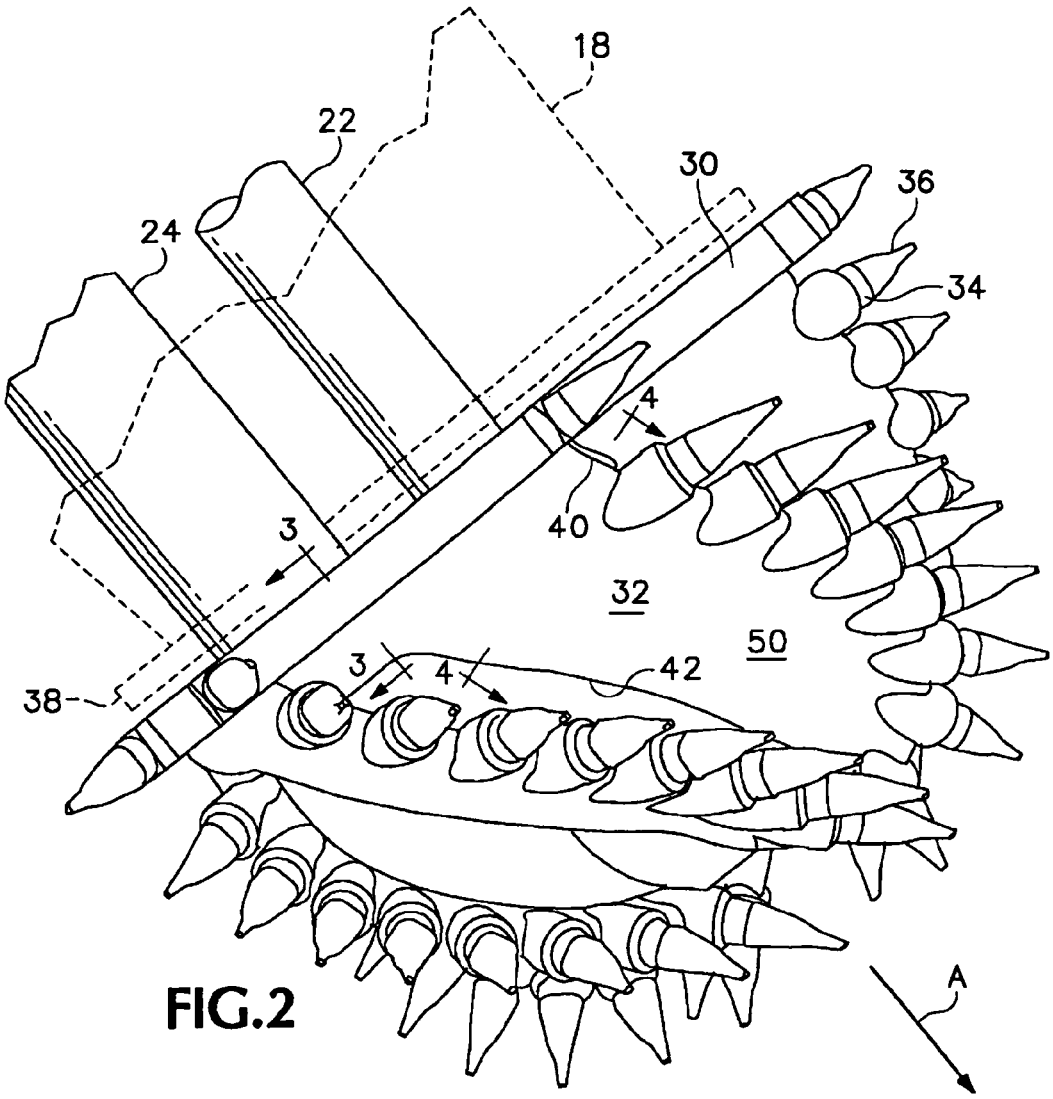
FIG. 2 is a side view of an exemplary dredge cutterhead of the present invention mounted to the end of a ladder.
Figure 5:
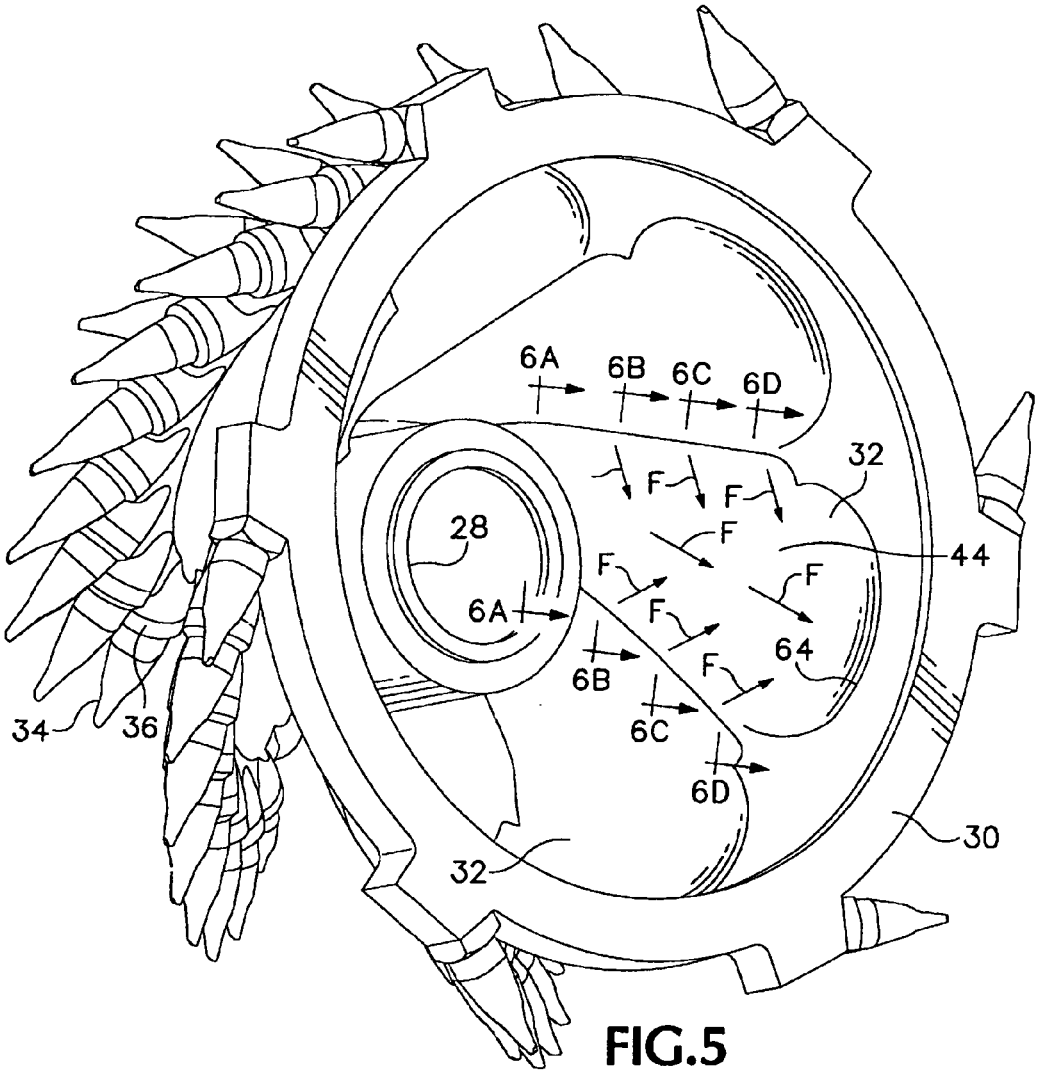
FIG. 5 is a perspective view from the rear of the cutterhead of FIG. 2.

FIG. 2 shows a side view of the cutterhead 20 at the end of the ladder 18 and supported by the shaft 22. As shown in FIGS. 2 and 5, the cutterhead has a hub 28, ring 30 and interconnecting arms 32. The hub 28 is used to attach the cutterhead 20 to the shaft 22. The cutterhead 20 may be attached to the shaft 22 in any conventional manner that allows the hub 28 to be supported and rotated by the shaft 22. The arms 32 curve in a helical manner around a rotational axis A of the cutterhead defined by the shaft 22. (See FIG. 2.) Protruding from the arms 32 are a plurality of adapters 34 for receiving cutting teeth 36. Cutting teeth 36 suitable for use with the present invention include any conventional cutting teeth, such as those disclosed in U.S. Pat. No. 4,335,532, the disclosure of which is herein incorporated by reference.

Mounted at the end of the ladder 18 is a conventional backing plate 38 which covers the rear opening of the cutterhead 20. The backing plate 38 has a conventional opening (not shown), which communicates with the entrance or mouth of the suction pipe 24. Thus, the backing plate 38 substantially prevents material from exiting the rear of the cutterhead except through the suction pipe mouth. The backing plate 38 and suction pipe mouth may be conventional. Material loosened by the teeth 36 enters the interior of the cutterhead 20, moves along the interior surface of the arms 32, and toward the suction pipe mouth, which then removes the loosened material to the dredger 10.

The cutterhead 20 of the present invention achieves its advantages by more efficiently moving, or "pumping," the loosened material from the interior of the cutterhead along the interior surface of the arms 32 toward the suction pipe mouth, and by capturing more of the loosened material within the interior of the cutterhead. The cutterhead achieves these advantages through the use of a novel arm shape and a novel ring shape.

Turning now to the arms 32, FIG. 4 shows an exemplary cross-section of an arm 32 having a leading edge 40, a trailing edge 42, and a trough portion 44 therebetween. (As illustrated herein for all arm cross-section, the cross-sections are taken along a line connecting equal percentages of the length of the leading and trailing edges.) The interior surface 46 of the trough portion 44 is contoured such that the dirt and rocks loosened by the cutting teeth 36 during dredging which enter the interior of the cutterhead 20 will be pushed, or "pumped," under the combined influence of gravity, buoyancy and centrifugal force, along the interior surface 46 of the arm 32 toward the ring 30. The surface is contoured such that the slope of the surface at any point is at an angle such that the net force drives the material in the desired direction. The "pumping" nature of the arms results from a combination of the trough shape of the arm, the helix angle of the arm, and the aspect ratio ($\beta$) of the cutterhead. The resulting shape of the arm is such that the net force exerted on material within the trough portion pushes the material toward the ring generally along the center of the trough portion.

FIG. 5 shows exemplary flow vectors F showing the direction in which the material is pushed by the net force at particular locations within the trough portion. As can be seen, the net force urges the loosened material toward the ring generally along the center of the trough portion. Material at the sides of the trough portion is directed toward both the center of the trough portion and the ring, while material located at the center of the trough is directed along the center toward the ring. The interior surface 46 of the trough portion 44 is preferably smooth and free from ridges that might block or obstruct movement of the material along the arm 32 toward the ring 30.

The arm 32 thus acts like the vane of a pump and causes the loosened material, upon entering the interior of the cutterhead 20, to be captured within the interior of the cutterhead and move along the arm 32 toward the mouth of the suction pipe 24. The result is that the cutterhead 20 achieves greater efficiency during dredging by capturing material that might otherwise pass out of the cutterhead 20, and allows the cutterhead 20 to achieve a finished bed depth that is deeper than the mouth of the suction pipe 24, as shown in FIG. 1.

Turning to the arm 32 in more detail, FIGS. 6A-6D show several cross-sections of the arm 32 taken at successive locations from the top of the arm 32 toward the bottom, as shown by lines 6A-6A to 6D-6D of FIG. 5. (As used herein, "top" refers to the end of the arm near the hub 28, and "bottom" refers to the end of the arm near the ring 30.) In contrast, corresponding cross-sections from a prior art cutterhead are shown in FIGS. 7A-7D.

Figure 6A:
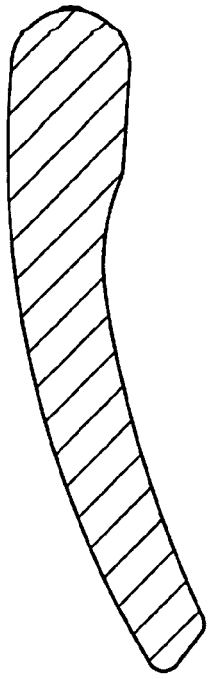
FIGS. 6A-6D are cross-sections taken along the corresponding lines 6A-6A to 6D-6D of the cutterhead of FIG. 5.
Figure 6B:
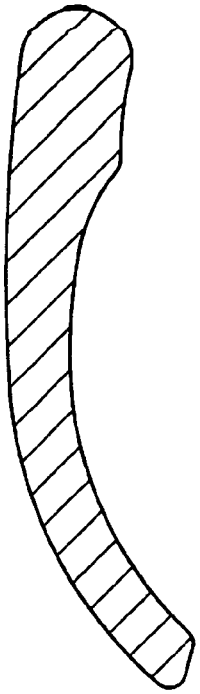
Figure 6C:
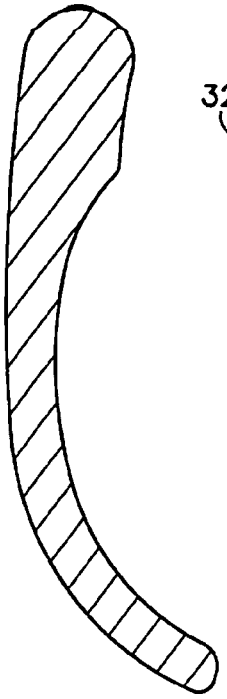
Figure 6D:
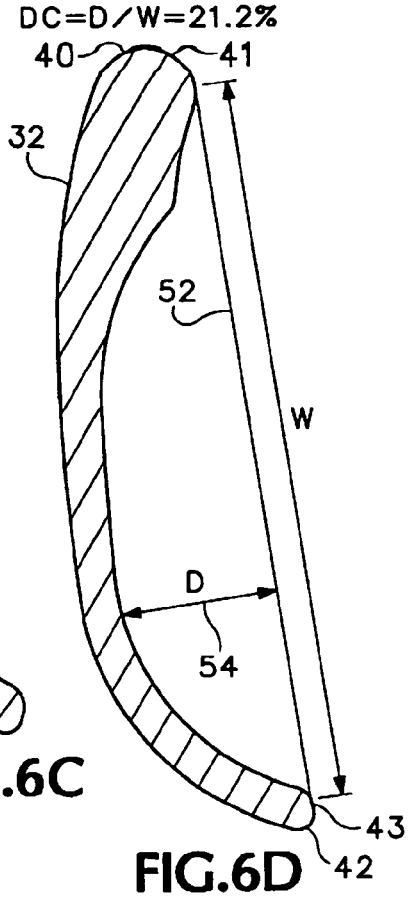
Figure 7A:
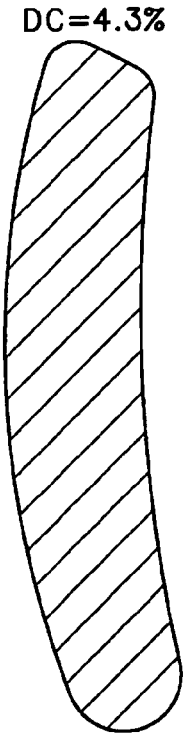
FIG.7A PRIOR ART
FIGS. 7A-7D are cross-sections from a prior art cutterhead taken at about the same locations along the arm as those of FIGS. 6A-6D.
Figure 7B:
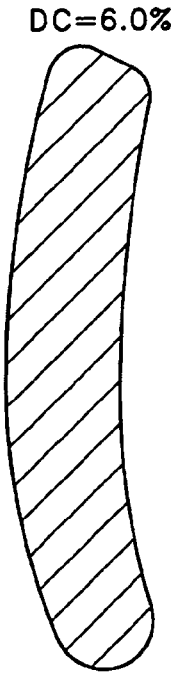
FIG.7B PRIOR ART
Figure 7C:
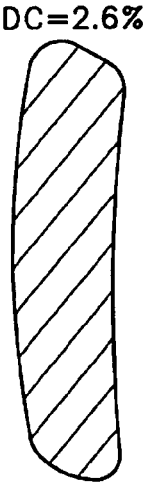
FIG.7C PRIOR ART
Figure 7D:
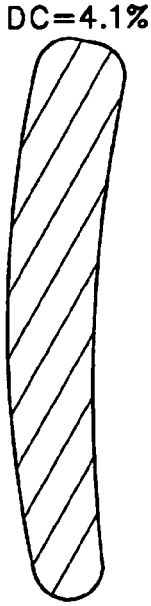
FIG.7D PRIOR ART

The interior face 49 of the arm 32 is sufficiently curved so as to retain material loosened by the cutting teeth, thus preventing material from falling off the trailing edge of the arm and exiting the cutterhead. By "curved" is meant the degree of curvature of the interior face 49 from the leading edge 40 to the trailing edge 42 of the arm. A degree of curvature ("D.C.") of a section at any point along the arm may be determined by taking the ratio of (1) the depth of the trough portion 44 at that point and (2) the width of the interior face 49 of the arm at that point. The "depth" of the trough portion is determined by the greatest perpendicular distance between the inner-surface of the trough portion 44 and a straight line interconnecting the innermost surfaces of the leading edge and the trailing edge. For example, FIG. 6D shows a straight line 52 connecting the innermost surface 41 of the leading edge 40 with the innermost surface 43 of the trailing edge 42. The line 54 is the maximum perpendicular distance between the interior surface of the trough portion and the line 52. The degree of curvature is the ratio of the depth D, i.e., length of line 54, to the width W between the points 41 and 43, i.e., the length of line 52.

By "sufficiently curved" is meant that the arm has a degree of curvature that is sufficient to retain material within the trough portion. In general, the degree of curvature near the hub is at least about 8%, and more preferably about 10 to 12%. The degree of curvature near the ring is at least about 10%, more preferably about 15%, and even more preferably, about 20 to 25%. A degree of curvature near the ring of at least 10% insures that the net force exerted on material near the ring will urge material toward the ring, and also allows the trough portion to accommodate the material flowing down the arm and also entering the arm over the leading edge near the ring. By "near the hub" is meant within the upper 20% of the arm length adjacent to the hub 28, and by "near the ring" is meant within the lower 20% of the arm length adjacent to the ring 30. For example, as shown in FIGS. 6A-6D, the degree of curvature for an exemplary arm of the present invention ranges from a minimum degree of curvature of about 10% near the hub to a maximum degree of curvature of about 21% near the ring, and has an average degree of curvature of about 15%. In contrast, FIGS. 7A-7D show a conventional prior art arm in which the degree of curvature varies from between 2.6% to 6.0%, and has an average degree of curvature of about 4.5%.

Preferably, the degree of curvature generally increases along the arm 32 from the top near the hub 28 toward the bottom of the arm 32 near the ring 30. By "generally increases" is meant that the degree of curvature on average increases over at least the lower portion of the arm, that is from a location at about 50% of the arm length from the hub to the ring. More preferably, the degree of curvature on average increases over at least 70% of the length of the arm, and even more preferably on average increases over at least 90% of the length of the arm. While the degree of curvature increases on average, nevertheless the degree of curvature may vary over a given length, and may even decrease over short portions of the arm.

Increasing the degree of curvature along the arm allows the trough portion to retain the material flowing along the trough and admit additional loosened material entering the trough portion from the lower portion of the leading edge. Because the degree of curvature generally increases, the maximum degree of curvature is preferably located lower than the minimum degree of curvature. The degree of curvature near the ring 30 is preferably at least 1.5 times, and even more preferably at least 2 times, the degree of curvature near the hub 28.

For example, FIGS. 6A-6D show the degree of curvature, D.C., increasing from about 9.7% near the hub 28 to about 21.2% near the ring 30. Thus, the degree of curvature near the ring 30 is about 2 times the degree of curvature near the hub 28. In contrast, for the prior art arm of FIGS. 7A-7D, the degree of curvature of the arm does not generally increase along the midportion of the arm, but instead decreases. The degree of curvature near the ring of the prior art arm is slightly less than the degree of curvature near the hub of the prior art arm. In fact, for the conventional prior art arm shown in FIGS. 7A-7D, the maximum degree of curvature is above, rather than below, the minimum degree of curvature.

Returning to the exemplary cross-section of FIG. 4, in one preferred embodiment the interior face 49 of the present invention preferably has a leading portion 48 for supporting the adapters 34, shaped similarly to the leading portion of the prior art arm 32' shown in FIG. 4A. The leading portion 48 has a thickness $W_L$ which is similar to that of the prior art arm 32'. The thickness $W_L$ provides support for the adapters 34 and cutting teeth 36, which are subjected to extreme forces when cutting into hard materials such as rock. In addition, the thickness of the leading portion 48 allows the arm 32 to withstand wear and abrasion encountered during dredging.

The leading portion 48 preferably curves inwardly to provide a space between each of the respective arms 32 for dredged material to enter the interior of the cutterhead. Preferably, the leading portion 48 is aligned with or follows the cutting teeth 36 of the arm, so as to minimize the wear of the arm. The leading portion 48 may have an interior radius of curvature $R_L$ which is similar to the conventional radius of curvature of the prior art arm 32'. The radius of curvature $R_L$ varies along the arm from the ring 30 to the hub 28, but in general is such that the arm 32 curves in a smooth helical fashion from the ring 30 to the hub 28. The width of the leading portion 48 may vary, but generally comprises from 10% to 35% of the width of the interior face 49.

In one preferred embodiment, the trough portion at any section further comprises three different areas, each having a different radius of curvature $R_1$, $R_2$ and $R_3$. The first area 56 has a radius of curvature $R_1$ that is much smaller than that of $R_L$. As shown in FIG. 4, the interior surface 46 in the first area 56 curves in a concave manner such that the thickness of the arm gradually decreases in a transverse direction. The first area 56 smoothly transitions to a second area 58 having a radius of curvature $R_2$ that is greater than $R_1$ and is similar to that of $R_L$. The arm 32 has a thickness $W_T$ in the second area 58 which is thinner than the thickness $W_L$ of the leading portion 48. The second area 58 smoothly transitions to a third area 60 having a radius of curvature $R_3$, at any point along the arm, that is less than $R_2$. The smaller radius of curvature $R_3$ for the third area 60 causes the third area 60 to curl inwardly toward the interior of the cutterhead 20. Preferably, the trailing edge 42 curves inwardly into the interior of the cutterhead 20 beyond the interior surface 46 of the leading portion 48 of the arm 32. The average radius of curvature of the trough portion 44, defined as the average of $R_1$, $R_2$, and $R_3$, is less than the radius of curvature of the leading portion $R_L$.

While FIGS. 4 and 6A-6D show an arm having an interior face comprising a leading portion and a trough portion, the requisite degree of curvature may be obtained without differentiating the arm into two such portions. Thus, the arm may have a uniform thickness. Nor is it necessary that the trailing edge curl inwardly. The interior surface 46 may be defined by any curve or combination of curves, and is not restricted to arcs and lines. While smooth surfaces are desired, it may be possible to obtain the requisite degree of curvature using a plurality of flat surfaces which transition at sharp angles along the interior surface of the trough.

In addition, while the figures show each arm having a trough portion, it is only necessary that a plurality of the arms be pumping in nature. Thus, for example, the cutterhead may be provided with three pumping arms having the degree of curvature described above, and three conventional arms.

The ability of the cutterhead 20 to efficiently move loosened material toward the ring, or its "pumping" nature, may be improved by optionally increasing the helix angle of the trough portion of the arm 32. As shown in FIG. 9 the helix angle of an arm 32 is the included angle $\gamma$ between the tangent to the curve of interest (such as the leading edge) at a given point and a plane that is parallel to the ring of the cutterhead. A conventional average helix angle for an arm along the leading edge is typically between 135° and 140°. Increasing the helix angle of the trough portion of the arm causes the arm to act more like a closed Archimedes screw.

One method for effectively increasing the helix angle of the trough portion is to increase the width of the arm of the cutterhead from the top to the bottom of the arm. For example, FIGS. 6A-6D show the width of the arm near the ring (shown by the length of line 52 in FIG. 6D) is about 10% wider than the width of the arm near the hub (FIG. 6A). In contrast, the width of the arm for a conventional cutterhead usually decreases from near the hub toward the mid portion of the arm, as shown in FIGS. 7A-7D. Preferably, the width of the arm near the ring is at least 5% wider than the width near the hub, more preferably at least 10% wider, and even more preferably at least 15% wider.

Another method for increasing the helix angle of the trough portion is to increase the helix angle of the leading edge. Preferably, the helix angle of the leading edge is at least 140°, and more preferably at least 145°.

Likewise, the pumping nature of the cutterhead may be improved by optionally increasing the aspect ratio ($\beta$) of the cutterhead 20. The aspect ratio of the cutterhead is the ratio of the outside diameter of the ring 30 to the height of the cutterhead 20. The height of the cutterhead is the distance along the rotational axis A through the hub 28 between the top 62 of the hub and a horizontal plane defined by the bottom of the ring 30 as shown in FIG. 9. A conventional cutterhead typically has an aspect ratio of about 1.4 to 1.7. The aspect ratio of the cutterhead of the present invention is preferably at least 1.7, more preferably at least 2, and even more preferably at least 2.2. Increasing the aspect ratio allows the arm to take greater advantage of the centrifugal force to push material toward the ring.

The flow of material into the suction mouth may be enhanced by continuing the trough portion into the ring 30. As shown in particular in FIGS. 5 and 8, the ring 30 may optionally define a plurality of notches 64 along the interior of the ring 30, each communicating with a trough portion. The notches 64 improve material flow into the suction pipe mouth. Optionally, for embodiments which do not include an annular channel in the ring (discussed below), the notches may be continued through the ring so as to allow material to flow over the ring and into the suction mouth.

Figure 3:
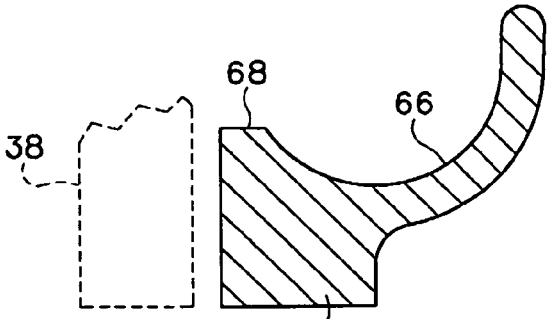
FIG. 3 is a sectional view of the ring taken along the line 3-3 of FIG. 2.
Figure 3A:
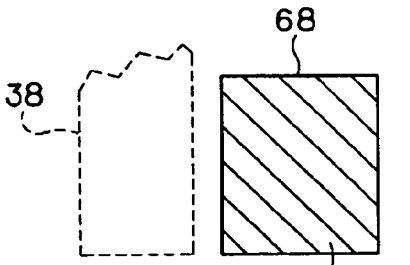
FIG.3A (PRIOR ART)
FIG. 3A is a sectional view of a prior art ring.
Figure 8:
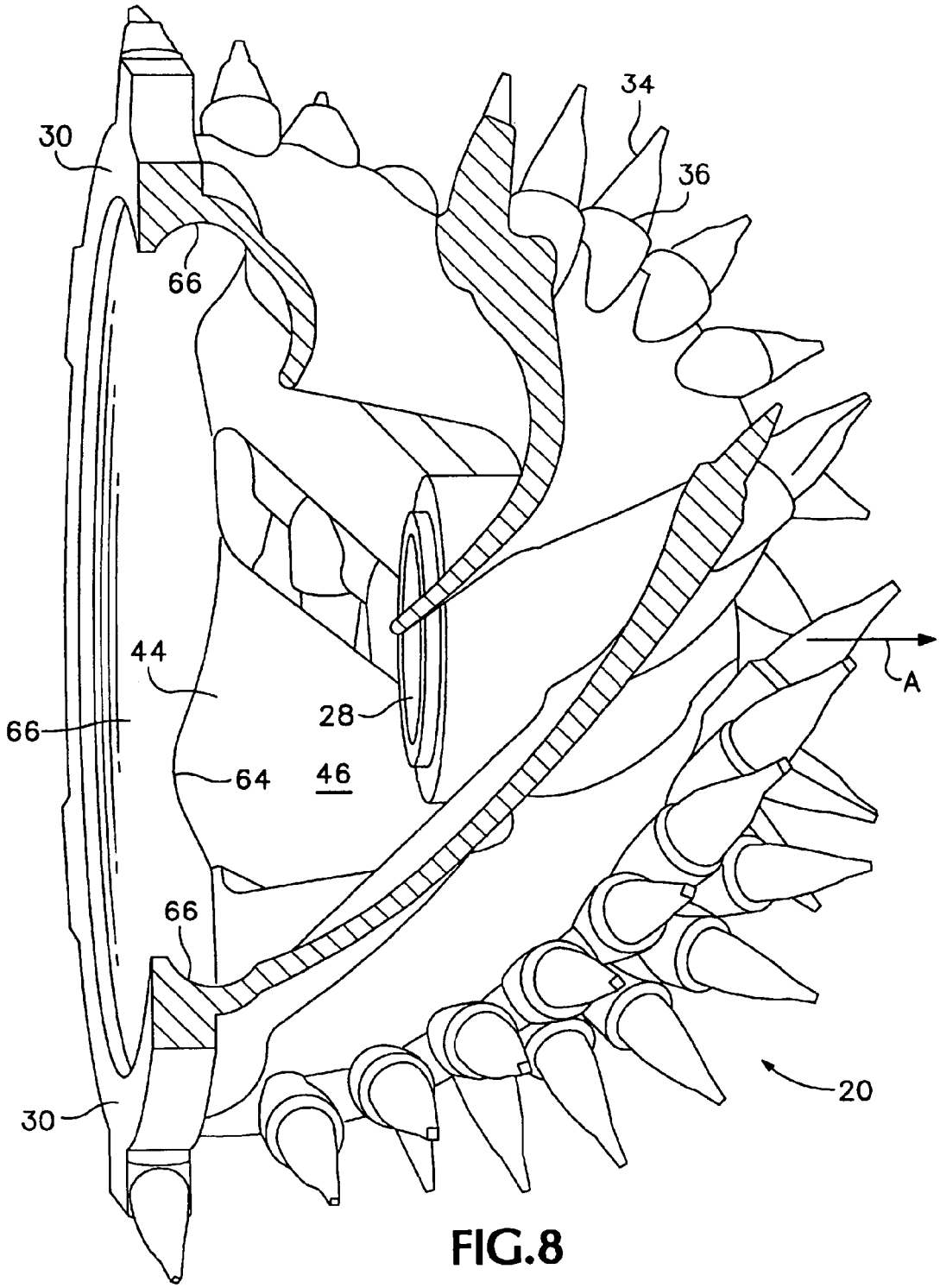
FIG. 8 is a side sectional view of the cutterhead of FIG. 2.
Figure 10A:
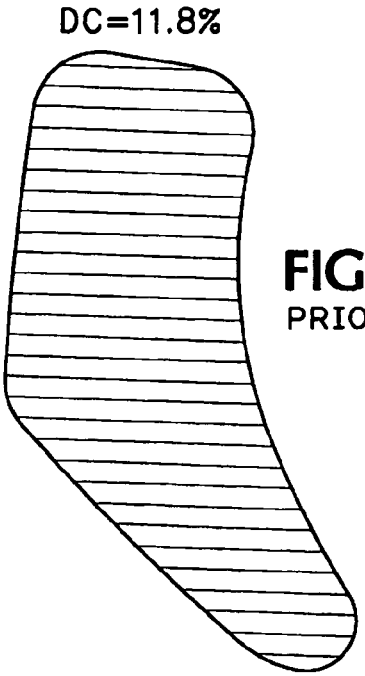
FIG.10A PRIOR ART
FIGS. 10A-10D show cross-sections of another prior art cutterhead corresponding to the cross-sections of FIGS. 6A-6D.
Figure 10B:
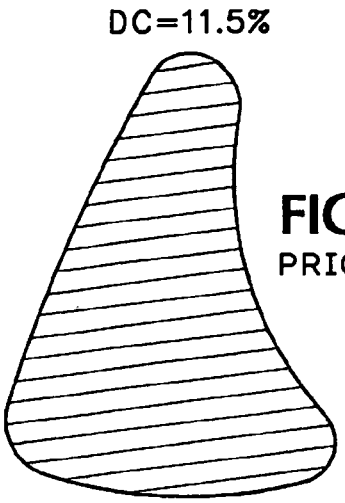
FIG.10B PRIOR ART
Figure 10C:
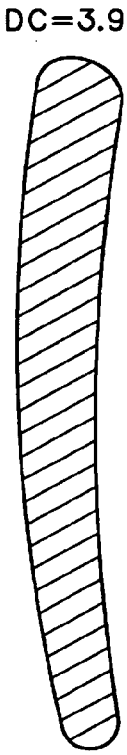
FIG.10C PRIOR ART
Figure 10D:
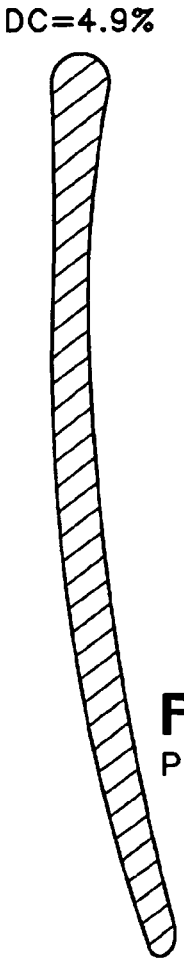
FIG.10D PRIOR ART

In another separate aspect of the invention, the ring 30 of the cutterhead 20 defines an annular channel 66 preferably having a cross-section in the shape of a "half-pipe" as shown in FIGS. 3 and 8. As used herein, the term "ring" is used broadly to refer to the lower portion of the cutterhead which interconnects the arms. The half-pipe shape of the ring is in contrast to the prior art ring which is generally rectangular in cross-section, such as shown in FIG. 3A. As shown in FIGS. 3 and 8, the channel 66 of the present invention extends around the entire interior of the ring so as to retain loosened material. The channel 66 receives the loosened material which flows from the trough portions 44 into the channel 66, allowing the loosened material which enters the ring 30 at a location removed from the suction pipe to move along the channel 66 toward the bottom of the ring 30, where the suction mouth is located, as shown in FIG. 2. In this manner, the channel 66 further improves the efficiency of dredging by retaining the loosened material and causing the material to be directed toward the suction mouth so as to be removed. Preferably, the ring defines notches 64 which allow the channel 66 to communicate with the trough portion 44 of the arm 32.

While FIGS. 3 and 8 show that a portion of the channel 66 is formed as a result of removal of material from the inner portion 68 of the ring 30 so as to define a portion of the channel, the inner portion 68 of the ring may have a square cross-section and the channel may be formed by a lip or other structure associated with the ring in order to form a channel for receiving loosened material. The channel may also have a cross-section shape other than a half-pipe, so long as it remains capable of retaining material within the channel.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A dredge cutterhead comprising:

(a) a hub, a ring, and a plurality of helical arms interconnecting said hub and said ring;

(b) each of said helical arms having a leading edge [for attachment of cutting teeth,] *and* a trailing edge, and *at least some of the helical arms being driving helical arms each having* a trough portion located between said leading and trailing edges and extending along said *driving* helical arm toward said ring, *each* said trough portion being substantially free from structures obstructing movement of material along said *driving* helical arm toward said ring, *and each said trough portion having a degree of curvature of between about 10% to about 25%*; and (c) each of said *driving* helical arms being shaped such that said leading edge of a part of a respective *driving* helical arm near said ring trails behind said leading edge of a part of said respective helical arm near said hub as said cutterhead is rotated about a rotational axis thereof, and a net force exerted on dredged material in said trough portion pushes said material toward said ring [generally] along [the center of] said trough portion as said cutterhead is rotated.

2. The dredge cutterhead of claim 1 wherein each of said *driving* helical arms has a degree of curvature that generally increases along at least a respective portion of each of said *driving* helical arms that is nearer to said ring than to said hub.

3. The dredge cutterhead of claim 1 wherein each of said *driving* helical arms has a maximum degree of curvature and a minimum degree of curvature, and wherein said maximum degree of curvature is located nearer to said ring than is said minimum degree of curvature.

4. The dredge cutterhead of claim 1 wherein each of said *driving* helical arms has a degree of curvature near said ring and a degree of curvature near said hub, and wherein said degree of curvature near said ring is at least 1.5 times as great as said degree of curvature near said hub.

5. The dredge cutterhead of claim 1 wherein each of said *driving* helical arms is wider near said ring than near said hub.

6. The dredge cutterhead of claim 1 [herein] *wherein each* said leading edge has a helix angle of at least 140° near said ring.

7. The dredge cutterhead of claim 1 wherein said cutterhead has an aspect ratio of at least 2.0.

8. The dredge cutterhead of claim 1 wherein *each* said trough portion is thinner than a leading portion of each of said *driving* helical arms.

9. The dredge cutterhead of claim 1 wherein said ring further defines a plurality of notches, each of said notches communicating with a respective trough portion.

10. The dredge cutterhead of claim 1 wherein said trailing edge *of each said driving helical arm* curves inwardly into the interior of said cutterhead.

11. The dredge cutterhead of claim 1 wherein said ring defines a channel extending annularly along an interior of said ring and facing openly inward from said ring toward said rotational axis of said cutterhead.

[12. A dredge cutterhead comprising:

(a) a hub, a ring and a plurality of helical arms interconnecting said hub and said ring;

(b) each of said helical arms having a leading edge for attachment of cutting teeth, a trailing edge, and a trough portion located between said leading and trailing edges and extending along said helical arm toward said ring, said trough portion being free from structures obstructing movement of material along said helical arm toward said ring; and (c) each of said helical arms having a degree of curvature near said ring of at least 15%.]

[13. The dredge cutterhead of claim 12 wherein said degree of curvature generally increases over at least a respective portion of each of said helical arms that is located nearer to said ring than to said hub.]

14. [The] *A* dredge cutterhead [of claim 12] *comprising:*

(*a*) *a hub, a ring and a plurality of helical arms interconnecting said hub and said ring;*

(*b*) *each of said helical arms having a leading edge and a trailing edge, and a plurality of the helical arms being driving helical arms each having a trough portion located on an inner side of the driving helical arm between said leading and trailing edges and extending along said driving helical arm toward said ring, each said trough portion being free from structures obstructing movement of material along said driving helical arm toward said ring; and*

(*c*) *each of said driving helical arms having a degree of curvature that is larger near said ring than near said hub and which has a degree of curvature near said ring of at least 15%,* wherein each of said *driving* helical arms has a minimum and a maximum degree of curvature *that are different*, and wherein said maximum degree of curvature is located nearer to said ring than is said minimum degree of curvature.

15. The dredge cutterhead of claim 14 wherein said minimum degree of curvature is near said hub and said maximum degree of curvature is near said ring.

16. [The] *A* dredge cutterhead [of claim 12] *comprising:*

(*a*) *a hub, a ring and a plurality of helical arms interconnecting said hub and said ring;*

(*b*) *each of said helical arms having a leading edge and a trailing edge, and a plurality of the helical arms being driving helical arms each having a trough portion located on an inner side of the driving helical arm between said leading and trailing edges and extending along said driving helical arm toward said ring, each said trough portion being free from structures obstructing movement of material along said driving helical arm toward said ring; and*

(*c*) *each of said driving helical arms having a degree of curvature that is larger near said ring than near said hub and which has a degree of curvature near said ring of at least 15%,* wherein said degree of curvature at a location near said ring is at least 1.5 times as great as said degree of curvature at another location near said hub *for each said driving helical arm.*

17. [The] *A* dredge cutterhead [of claim 12] *comprising:*

(*a*) *a hub, a ring and a plurality of helical arms interconnecting said hub and said ring;*

(*b*) *each of said helical arms having a leading edge and a trailing edge, and a plurality of the helical arms being driving helical arms each having a trough portion located on an inner side of the driving helical arm between said leading and trailing edges and extending along said driving helical arm toward said ring, each said trough portion being free from structures obstructing movement of material along said driving helical arm toward said ring; and*

(*c*) *each of said driving helical arms having a degree of curvature that is larger near said ring than near said hub and which has a degree of curvature near said ring of at least 15%,* wherein each of said *driving* helical arms is wider near said ring than near said hub.

18. [The] *A* dredge cutterhead [of claim 12] *comprising:*

(*a*) *a hub, a ring and a plurality of helical arms interconnecting said hub and said ring;*

(*b*) *each of said helical arms having a leading edge and a trailing edge, and a plurality of the helical arms being driving helical arms each having a trough portion located on an inner side of the driving helical arm between said leading and trailing edges and extending along said driving helical arm toward said ring, each said trough portion being free from structures obstructing movement of material along said driving helical arm toward said ring; and*

(*c*) *each of said driving helical arms having a degree of curvature that is larger near said ring than near said hub and which has a degree of curvature near said ring of at least 15%,* wherein *each* said leading edge has a helix angle of at least 140° near said ring.

19. [The] *A* dredge cutterhead [of claim 12] *comprising:*

(*a*) *a hub, a ring and a plurality of helical arms interconnecting said hub and said ring;*

(*b*) *each of said helical arms having a leading edge and a trailing edge, and a plurality of the helical arms being driving helical arms each having a trough portion located on an inner side of the driving helical arm*

*between said leading and trailing edges and extending along said driving helical arm toward said ring, each said trough portion being free from structures obstructing movement of material along said driving helical arm toward said ring; and*

(*c*) *each of said driving helical arms having a degree of curvature that is larger near said ring than near said hub and which has a degree of curvature near said ring of at least 15%,* wherein said cutterhead has an aspect ratio of at least 1.7.

20. The dredge cutterhead of claim [12] *14* wherein said trough portion is thinner than a leading portion of *each* said *driving helical* arm.

21. The dredge cutterhead of claim [12] *14* wherein said ring further defines a plurality of notches, each of said notches communicating with a respective trough portion.

22. The dredge cutterhead of claim [12] *14* wherein said trailing edge *of each said driving helical arm* curves inwardly into the interior of said cutterhead.

23. [The] *A* dredge cutterhead [of claim 12] *comprising:*

(*a*) *a hub, a ring and a plurality of helical arms interconnecting said hub and said ring;*

(*b*) *each of said helical arms having a leading edge and a trailing edge, and a plurality of the helical arms being driving helical arms each having a trough portion located on an inner side of the driving helical arm between said leading and trailing edges and extending along said driving helical arm toward said ring, each said trough portion being free from structures obstructing movement of material along said driving helical arm toward said ring; and*

(*c*) *each of said driving helical arms having a degree of curvature that is larger near said ring than near said hub and which has a degree of curvature near said ring of at least 15%,* wherein said ring defines a channel extending annularly along an interior of said ring and facing openly inward from said ring toward a rotational axis of said cutterhead.

24. A dredge cutterhead comprising:

(a) a hub, a ring and a plurality of helical arms interconnecting said hub and said ring;

(b) each of said helical arms being capable of supporting a plurality of cutting teeth; and (c) said ring defining a channel extending annularly along an interior of said ring and facing openly inward from said ring toward a rotational axis of said cutterhead for retaining loosened material.

25. The dredge cutterhead of claim 24 wherein said channel has a cross-section in the shape of a half-pipe.

26. The dredge cutterhead of claim 24 wherein at least one of said helical arms has a trough portion extending therealong toward said ring.

27. The dredge cutterhead of claim 26 wherein said ring defines a notch in communication with said trough portion and said channel.

[28. A dredge cutterhead comprising:

(a) a hub, a ring defining an annular channel having a cross-section in the shape of a half-pipe, and a plurality of helical arms interconnecting said hub and said ring;

(b) each of said helical arms having a leading edge for attachment of cutting teeth, a trailing edge, and a trough portion therebetween; and (c) each of said helical arms having a degree of curvature near said ring of at least 10%.]

29. [The] *A* dredge cutterhead [of claim 28] *comprising:*

(*a*) *a hub, a ring defining an annular channel having a cross-section in the shape of a half-pipe, and a plurality of helical arms interconnecting said hub and said ring;*

(*b*) *each of said helical arms having a leading edge for attachment of cutting teeth, a trailing edge, and a trough portion therebetween; and*

(*c*) *each of said helical arms having a degree of curvature near said ring of at least 10%,* wherein said ring defines a notch in communication with said trough portion and said channel.

[30. A dredge cutterhead comprising:

(a) a hub, a ring and a plurality of helical arms interconnecting said hub and said ring;

(b) each of said helical arms being capable of supporting a plurality of cutting teeth; and (c) said ring defining an interior annular channel having a cross-section in the shape of a halfpipe, for retaining loosened material.]

[31. The dredge cutterhead of claim 30 wherein at least one of said helical arms has a trough portion.]

32. [The] *A* dredge cutterhead [of claim 31] *comprising:*

(*a*) *a hub, a ring and a plurality of helical arms interconnecting said hub and said ring;*

(*b*) *each of said helical arms being capable of supporting a plurality of cutting teeth, wherein at least one of said helical arms has a trough portion; and*

(*c*) *said ring defining an interior annular channel having a cross-section in the shape of a half-pipe for retaining loosened material,* wherein said ring defines a notch in communication with said trough portion and said channel.

33. A dredge cutterhead comprising:

(a) a hub, a ring, and a plurality of helical arms interconnecting said hub and said ring;

(b) each of said helical arms having a leading edge for attachment of cutting teeth, a trailing edge, and a trough portion therebetween; and (c) each of said helical arms having a degree of curvature that generally increases along at least a portion of each of said helical arms that is located nearer to said ring than to said hub and being shaped such that a net force exerted on dredged material in said trough portion pushes said material toward said ring generally along the center of said trough portion.

34. A dredge cutterhead comprising:

(a) a hub, a ring, and a plurality of helical arms interconnecting said hub and said ring;

(b) each of said helical arms having a leading edge for attachment of cutting teeth, a trailing edge, and a trough portion therebetween; and (c) each of said helical arms having a maximum degree of curvature and a minimum degree of curvature *which are different*, and said maximum degree of curvature being located nearer to said ring than said minimum degree of curvature is located, and each of said helical arms being shaped such that a net force exerted on dredged material in said trough portion pushes said material toward said ring generally along the center of said trough portion.

35. A dredge cutterhead comprising:

(a) a hub, a ring, and a plurality of helical arms interconnecting said hub and said ring;

(b) each of said helical arms having a leading edge for attachment of cutting teeth, a trailing edge, and a trough portion therebetween;

(c) each of said helical arms being shaped such that a net force exerted on dredged material in said trough portion pushes said material toward said ring generally along the center of said trough portion; and (d) each of said helical arms having a degree of curvature near said ring and a degree of curvature near said hub, said degree of curvature near said ring being at least 1.5 times as great as said degree of curvature near said hub.

36. A dredge cutterhead comprising:

(a) a hub, a ring, and a plurality of helical arms interconnecting said hub and said ring;

(b) each of said helical arms having a leading portion, a leading edge for attachment of cutting teeth, a trailing edge, and a trough portion between said leading edge and said trailing edge, and said trough portion being thinner than said leading portion; and (c) each of said helical arms being shaped such that a net force exerted on dredged material in said trough portion pushes said material toward said ring generally along the center of said trough portion.

37. A dredge cutterhead comprising:

(a) a hub, a ring, and a plurality of helical arms interconnecting said hub and said ring;

(b) each of said helical arms having a leading edge for attachment of cutting teeth, a trailing edge, and a trough portion therebetween;

(c) each of said helical arms being shaped such that a net force exerted on dredged material in said trough portion pushes said material toward said ring generally along the center of said trough portion; and (d) said ring defining a plurality of notches, each of said notches communicating with a respective trough portion.

[38. A dredge cutterhead comprising:

(a) a hub, a ring and a plurality of helical arms interconnecting said hub and said ring;

(b) each of said helical arms having a leading edge for attachment of cutting teeth, a trailing edge, and a trough portion therebetween; and (c) each of said helical arms having a degree of curvature that generally increases over at least a portion of said arm that is located nearer to said ring than to said hub, and said degree of curvature near said ring being at least 10%.]

39. A dredge cutterhead comprising:

(a) a hub, a ring and a plurality of helical arms interconnecting said hub and said ring;

(b) each of said helical arms having a leading edge for attachment of cutting teeth, a trailing edge, and a trough portion therebetween;

(c) each of said helical arms having a minimum degree of curvature and a maximum degree of curvature *which are different*, said maximum degree of curvature being located nearer to said ring than is said minimum degree of curvature; and (d) each of said helical arms having a degree of curvature near said ring of at least 10%.

40. The dredge cutterhead of claim 39 wherein said minimum degree of curvature is near said hub and said maximum degree of curvature is near said ring.

41. A dredge cutterhead comprising:

(a) a hub, a ring and a plurality of helical arms interconnecting said hub and said ring;

(b) each of said helical arms having a leading edge for attachment of cutting teeth, a trailing edge, and a trough portion therebetween; and (c) each of said helical arms having a degree of curvature, said degree of curvature at a location near said ring being at least 1.5 times as great as said degree of curvature at another location near said hub, and said degree of curvature near said ring being at least 10%.

42. A dredge cutterhead comprising:

(a) a hub, a ring and a plurality of helical arms interconnecting said hub and said ring;

(b) each of said helical arms having a leading portion, a leading edge for attachment of cutting teeth, a trailing edge, and a trough portion between said leading edge and said trailing edge, and said trough portion being thinner than said leading portion; and (c) each of said helical arms having a degree of curvature near said ring of at least 10%.

43. A dredge cutterhead comprising:

(a) a hub, a ring and a plurality of helical arms interconnecting said hub and said ring;

(b) each of said helical arms having a leading edge for attachment of cutting teeth, a trailing edge, and a trough portion therebetween;

(c) each of said helical arms having a degree of curvature near said ring of at least 10%; and (d) said ring defining a plurality of notches, each of said notches communicating with a respective trough portion.

*44. The dredge cutterhead of claim 1 wherein all the helical arms are said driving helical arms.*

*45. The dredge cutterhead of claim 14 wherein all the helical arms are said driving helical arms.*

*46. The dredge cutterhead of claim 29 wherein the degree of curvature of each of the helical arms is smaller than about 25%.*

*47. A dredge cutterhead comprising:*

*(a) a hub, a ring and a plurality of helical arms interconnected said hub and said ring; and*

*(b) said ring defining a channel extending annularly along an interior of said ring and facing openly inward from said ring toward a rotational axis of said cutterhead for retaining loosened material.*

*48. A dredge cutterhead comprising:*

*(a) a hub, a ring, and a plurality of helical arms interconnecting said hub and said ring;*

*(b) each of said helical arms having a leading edge and a trailing edge, and a plurality of the helical arms being driving helical arms each having a trough portion between the leading and trailing edges; and*

*(c) each of said driving helical arms having a degree of curvature that generally increases along at least a portion of each of said driving helical arms that is located nearer to said ring than to said hub and being shaped such that a net force exerted on dredged material in said trough portion pushes said material toward said ring along said trough portion as the cutterhead is rotated.*

*49. A dredge cutterhead in accordance with claim 48 wherein the degree of curvature near the ring for each said driving helical arm is at least 10%.*

*50. A dredge cutterhead comprising:*

*(a) a hub, a ring, and a plurality of helical arms interconnecting said hub and said ring;*

*(b) each of said helical arms having a leading edge and a trailing edge, and a plurality of the helical arms being driving helical arms each having a trough portion between the leading and trailing edges; and*

*(c) each of said driving helical arms having a maximum degree of curvature and a minimum degree of curvature which are different, and said maximum degree of curva-*

*ture being located nearer to said ring than said minimum degree of curvature is located, and each of said driving helical arms being shaped such that a net force exerted on dredged material in said trough portion pushes said material toward said ring along said trough portion as the cutterhead is rotated.*

*51. A dredge cutterhead comprising:*

*(a) a hub, a ring, and a plurality of helical arms interconnecting said hub and said ring;*

*(b) each of said helical arms having a leading edge and a trailing edge, and a plurality of the helical arms being driving helical arms each having a trough portion between the leading and trailing edges;*

*(c) each of said driving helical arms being shaped such that a net force exerted on dredged material in said trough portion pushes said material toward said ring along said trough portion as the cutterhead is rotated; and*

*(d) each of said driving helical arms having a degree of curvature near said ring and a degree of curvature near said hub, said degree of curvature near said ring being at least 1.5 times as great as said degree of curvature near said hub.*

*52. A dredge cutterhead comprising:*

*(a) a hub, a ring, and a plurality of helical arms interconnecting said hub and said ring;*

*(b) each of said helical arms having a leading portion and a trailing edge, and a plurality of the helical arms being driving helical arms each having a trough portion between said leading edge and said trailing edge, and said trough portion being thinner than said leading portion; and*

*(c) each of said driving helical arms being shaped such that a net force exerted on dredged material in said trough portion pushes said material toward said ring generally along the center of said trough portion.*

*53. A dredge cutterhead in accordance with claim 52 wherein each of said driving helical arms having a degree of curvature near said ring of at least 10%.*

*54. A dredge cutterhead comprising:*

*(a) a hub, a ring, and a plurality of helical arms interconnecting said hub and said ring;*

*(b) each of said helical arms having a leading edge and a trailing edge, and a plurality of the helical arms being driving helical arms each having a trough portion between the leading and trailing edges;*

*(c) each of said driving helical arms being shaped such that a net force exerted on dredged material in said trough portion pushes said material toward said ring along said trough portion as the cutterhead is rotated; and*

*(d) said ring defining a plurality of notches, each of said notches communicating with a respective trough portion.*

*55. A dredge cutterhead comprising:*

*(a) a hub, a ring, and a plurality of helical arms interconnecting said hub and said ring, said dredge cutterhead having an aspect ratio of at least 1.4;*

*(b) each of said helical arms having a leading edge and a trailing edge, a plurality of the helical arms being driving helical arms each having a trough portion located between said leading and trailing edges and extending along said driving helical arm toward said ring, said trough portion being substantially free from structures obstructing movement of material along said driving helical arm toward said ring; and*

*(c) each of said driving helical arms being shaped such that said leading edge of a part of a respective driving helical arm near said ring trails behind said leading edge of a part of said respective helical arm near said hub as said cutterhead is rotated about a rotational axis thereof, and a net force exerted on dredged material in said trough portion pushes said material toward said ring along said trough portion as said cutterhead is rotated.*

*56. A dredge cutterhead in accordance with claim 55 wherein the aspect ratio is at least 1.7.*

*57. A dredge cutterhead in accordance with claim 56 wherein each said helical arm is a driving helical arm.*

*58. A dredge cutterhead in accordance with claim 55 wherein the aspect ratio is at least 2.*

*59. A dredge cutterhead comprising:*

*(a) a hub, a ring, and a plurality of helical arms interconnecting said hub and said ring;*

*(b) each of said helical arms having a leading edge and a trailing edge, a plurality of the helical arms being driving helical arms each having a trough portion located between said leading and trailing edges and extending along said driving helical arm toward said ring, each said trough portion being substantially free from structures obstructing movement of material along said driving helical arm toward said ring, and each said trough portion having a pair of ends that curve inward relative to a central portion of the trough portion; and*

*(c) each of said driving helical arms being shaped such that said leading edge of a part of a respective driving helical arm near said ring trails behind said leading edge of a part of said respective helical arm near said hub as said cutterhead is rotated about a rotational axis thereof, and a net force exerted on dredged material in said trough portion pushes said material toward said ring along said trough portion as said cutterhead is rotated.*

*60. A dredge cutterhead comprising:*

*(a) a hub, a ring, and a plurality of helical arms interconnecting said hub and said ring;*

*(b) each of said helical arms having a leading edge and a trailing edge, a plurality of the helical arms being driving helical arms each having a trough portion located between said leading and trailing edges, and a leading portion between the leading edge and the trough portion, the leading portion having a width that is within 10% to 35% of the width of the entire driving helical arm, and the trough portion extending along each said driving helical arm toward said ring, each said trough portion being substantially free from structures obstructing movement of material along said driving helical arm toward said ring; and*

*(c) each of said driving helical arms being shaped such that said leading edge of a part of a respective driving helical arm near said ring trails behind said leading edge of a part of said respective helical arm near said hub as said cutterhead is rotated about a rotational axis thereof, and a net force exerted on dredged material in said trough portion pushes said material toward said ring along said trough portion as said cutterhead is rotated.*

*61. A dredge cutterhead comprising:*

*(a) a hub, a ring, and a plurality of helical arms interconnecting said hub and said ring;*

*(b) each of said helical arms having a leading edge and a trailing edge, a plurality of the helical arms being driving helical arms each having a trough portion located between said leading and trailing edges and extending along said driving helical arm toward said ring, each said trough portion being substantially free from structures obstructing movement of material along said driving helical arm toward said ring; and*

(c) *each of said driving helical arms being shaped such that a width of each said driving helical arm generally increases from the hub to the ring said leading edge of a part of a respective driving helical arm near said ring trails behind said leading edge of a part of said respective helical arm near said hub as said cutterhead is rotated about a rotational axis thereof, and a net force exerted on dredged material in said trough portion pushes said material toward said ring along said trough portion as said cutterhead is rotated.*

*62. A dredge cutterhead comprising:*

(a) *a hub, a ring, and a plurality of helical arms interconnecting said hub and said ring;*

(b) *each of said helical arms having a leading edge and a trailing edge, and a plurality of the helical arms being driving helical arms each having a trough portion located between said leading and trailing edges and extending along said driving helical arm toward said ring, each said trough portion being substantially free from structures obstructing movement of material along said driving helical arm toward said ring; and*

(c) *each of said driving helical arms being shaped such that (i) said leading edge of a part of a respective driving helical arm near said ring trails behind said leading edge of a part of said respective helical arm near said hub as said cutterhead is rotated about a rotational axis thereof, (ii) said trough portion at the trailing end being directed inward and downward to retain dredged material in the trough portion, and (iii) a net force exerted on dredged material in said trough portion pushes said material toward said ring along said trough portion as said cutterhead is rotated.*

*63. A dredge cutterhead comprising:*

(a) *a hub, a ring, and a plurality of helical arms interconnecting said hub and said ring;*

(b) *each of said helical arms having a leading edge and a trailing edge, said leading edge of each said helical arm near said ring trailing behind said leading edge of said helical arm near said hub as said cutterhead is rotated about a rotational axis, the leading edge being adapted to dig into the ground as the cutterhead is rotated, the arm traversing an arcuate path through the ground with each rotation of the cutterhead such that the leading edge initially moves downward into the ground and then upward out of the ground with each rotation about the rotational axis;*

(c) *the helical arms being positioned with gaps between each adjacent pair of arms through which dredged material passes into the cutterhead as the helical arms move through the ground; and*

(d) *a plurality of the helical arms being driving helical arms each having a trough portion located between said leading and trailing edges and extending along said driving helical arm toward said ring, each said trough portion facing generally inward and shaped with inturned sides to retain dredged material passing through the respective gap as the driving helical arm moves upward out of the ground, and each said trough portion being substantially free from structures obstructing movement of the dredged material retained in each said trough portion along said driving helical arm toward said ring; and*

(e) *said trough portion in each said driving helical arm being shaped along the length thereof such that gravity, buoyancy, and centrifugal forces caused by rotation of the cutterhead pushes the dredged material in said trough portion along the length of the trough portion to the ring as the arm moves upward out of the ground with each rotation of the cutterhead.*

*64. A dredge cutterhead comprising:*

(a) *a hub, a ring, and a plurality of helical arms interconnecting said hub and said ring;*

(b) *each of said helical arms having a leading edge and a trailing edge, and a plurality of the helical arms being driving helical arms each having a trough portion located between said leading and trailing edges and extending along said driving helical arm toward said ring, each said trough portion being substantially free from structures obstructing movement of material along said driving helical arm toward said ring; and*

(c) *each of said driving helical arms being shaped such that said leading edge of a part of a respective driving helical arm near said ring trails behind said leading edge of a part of said respective helical arm near said hub as said cutterhead is rotated about a rotational axis thereof, and a net force exerted on dredged material in said trough portion pushes said material along said trough portion as said cutterhead is rotated to and inward of said ring for collection into a suction pipe.*

* * * * *